(12) United States Patent
Qi (10) Patent No.: US 12,149,462 B2
(45) Date of Patent: Nov. 19, 2024

(54) POSITIONING REFERENCE SIGNAL

(71) Applicant: Samsung Electronics Co., Ltd., Gyeonggi-do (KR)

(72) Inventor: Yinan Qi, Middlesex (GB)

(73) Assignee: Samsung Electronics Co., Ltd (KR)

(*) Notice: Subject to any disclaimer, the term of this patent is extended or adjusted under 35 U.S.C. 154(b) by 704 days.

(21) Appl. No.: 17/278,045

(22) PCT Filed: Sep. 30, 2019

(86) PCT No.: PCT/KR2019/012773
§ 371 (c)(1),
(2) Date: Mar. 19, 2021

(87) PCT Pub. No.: WO2020/067848
PCT Pub. Date: Apr. 2, 2020

(65) Prior Publication Data
US 2021/0351887 A1 Nov. 11, 2021

(30) Foreign Application Priority Data

Sep. 28, 2018 (GB) ...................................... 1815890
Feb. 15, 2019 (GB) ...................................... 1902161

(51) Int. Cl.
*H04W 24/08* (2009.01)
*H04L 5/00* (2006.01)
*H04W 72/51* (2023.01)

(52) U.S. Cl.
CPC ........... *H04L 5/0048* (2013.01); *H04W 24/08* (2013.01); *H04W 72/51* (2023.01)

(58) Field of Classification Search
CPC ...... H04L 5/005; H04L 5/0048; H04W 24/08; H04W 72/51; H04W 72/046; H04B 7/0626
See application file for complete search history.

(56) References Cited

U.S. PATENT DOCUMENTS

| | | | |
|---|---|---|---|
| 8,891,480 B2 | 11/2014 | Bachu et al. | |
| 2013/0260793 A1* | 10/2013 | Lim | H04W 4/02 455/456.1 |

(Continued)

FOREIGN PATENT DOCUMENTS

| | | |
|---|---|---|
| WO | WO 2019/029536 | 2/2019 |
| WO | WO2019198994 | 10/2019 |
| WO | WO2020001380 | 1/2020 |
| WO | WO2020066103 | 4/2020 |
| WO | WO2020066106 | 4/2020 |
| WO | WO2020067848 | 4/2020 |

OTHER PUBLICATIONS

PCT/ISA/210 Search Report issued on PCT/KR2019/012773, Jan. 10, 2020, pp. 3.

(Continued)

*Primary Examiner* — Anez C Ebrahim
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method is provided for mapping Position Reference Signals (PRS) in a wireless communication system comprising a first User Equipment (UE) and a second UE. The method comprises identifying a first Bandwidth Part (BWP) for the first UE and a second BWP for the second UE, and mapping PRS to one or both of the first BWP and the second BWP.

20 Claims, 5 Drawing Sheets

(56) References Cited

U.S. PATENT DOCUMENTS

| | | | |
|---|---|---|---|
| 2017/0238298 A1 | 8/2017 | Wang et al. | |
| 2018/0054792 A1 | 2/2018 | Lee et al. | |
| 2018/0098187 A1 | 4/2018 | Blankenship et al. | |
| 2019/0335477 A1* | 10/2019 | Nam | H04W 72/542 |
| 2020/0177353 A1 | 6/2020 | Ding et al. | |
| 2021/0176687 A1* | 6/2021 | Ko | H04W 56/001 |

OTHER PUBLICATIONS

PCT/ISA/237 Written Opinion issued on PCT/KR2019/012773, Jan. 10, 2020, pp. 5.
Qualcomm Incorporated, "Remaining details for enhanced NPRS", 3GPP TSG RAN WG1 Meeting #94 R1-1809000, Gothenburg, Sweden, Aug. 11, 2018, pp. 5.
Huawei, HiSilicon, "On handling new and legacy NPRS for in-band operation mode", 3GPP TSG RAN WG1 Meeting #94 R1-1808113, Gothenburg, Sweden, Aug. 11, 2018, pp. 6.
Mitsubishi Electric, "Views on DL only based NR positioning techniques", 3GPP TSG RAN WG1 Ad-Hoc Meeting R1-1900635, Taipei, Taiwan, Jan. 12, 2019, pp. 5.
3GPP TR 38.913 V15.0.0 (Jun. 2018), Technical Report, pp. 39.
3GPP TS 22.261 V16.5.0 (Sep. 2018), Technical Specification, pp. 67.
3GPP TR 22.872 V16.1.0 (Sep. 2018), Technical Report, pp. 75.
3GPP TR 22.804 V16.1.0 (Sep. 2018), Technical Report, pp. 189.
GB Examination Report dated Jun. 25, 2021 issued in counterpart application No. 1902161.7, 3 pages.

\* cited by examiner

BWP2

BWP1　　　　　　　　　　　　　　　PRS

[Fig. 4]

BWP2

BWP1　　　　　　　　　　　　　　　PRS

[Fig. 5]

BWP2

BWP1

BWP3

POSITIONING REFERENCE SIGNAL

PRIORITY

This application is a National Phase Entry of PCT International Application No. PCT/KR2019/012773, which was filed on Sep. 30, 2019, and claims priority to Great Britain Patent Application Nos. 1815890.7 and 1902161.7, which were filed on Sep. 28, 2018 and Feb. 15, 2019, respectively, the content of each of which is incorporated herein by reference.

TECHNICAL FIELD

Certain examples of the present disclosure provide methods, apparatus and systems for providing a Positioning Reference Signal (PRS) for allowing the position of a User Equipment (UE) to be determined in a wireless communication system. For example, certain examples of the present disclosure provide methods, apparatus and systems for providing PRS in 3rd Generation Partnership Project (3GPP) 5th Generation (5G) New Radio (NR).

It further relates to improved positioning services in a telecommunication network. It relates particularly to Fifth Generation (5G) or New Radio (NR) systems, but can be applied in other systems also.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In wireless communication systems, it is often useful to be able to determine the position of a User Equipment (UE), for example to provide location-based services and emergency call positioning.

One example of a positioning method is Observed Time Difference Of Arrival (OTDOA). This technique is used, for example, in the 3rd Generation Partnership Project (3GPP) Long-Term Evolution (LTE) standard (e.g. as specified in Release-8, Release-9 and subsequent documents). In this technique, a UE measures the Time Of Arrival (TOA) of signals received from multiple base stations (eNBs) and the position of the UE is determined based on these measurements, as well as the known positions of the base stations, using geometry.

Although the OTDOA technique may, in principle, be performed based on any DownLink (DL) signals (e.g. synchronisation signals), in practice specific positioning signals are sometimes used, for example to improve performance. For example, in the LTE standard, Positioning Reference Signals (PRS) were introduced in Release-9. The PRS signals of LTE comprise pseudo-random sequences that are mapped to certain Resource Elements (REs) (e.g. REs that are not allocated to Physical Broadcast Channel (PBCH)). The UE may correlate the received PRS sequences with local copies of the sequences and determine the corresponding ranges (distances) to the base stations based on the positions of the correlation peaks.

The 3GPP 5th Generation (5G) standard is a new standard currently under development and intended to succeed 4G (including LTE) and earlier systems. 5G New Radio (NR) is an air interface developed by 3GPP for the 5G mobile network. NR UE-positioning mechanism is a study item in the current RAN1 (Radio Layer 1) Release-16 agenda, and is seen as a main area to be completed for 5G-NR to be compliant with Enhanced 9-1-1 (E911) and other emergency services requirements.

What is required is a positioning mechanism suitable for use in 5G-NR. For example, a technique using PRS with enhanced performance for 5G-NR requirements is desirable. Embodiments of the present invention aim to provide improved positioning performance compared to prior art solutions, whether mentioned herein or not.

The above information is presented as background information only to assist with an understanding of the present disclosure. No determination has been made, and no assertion is made, as to whether any of the above might be applicable as prior art with regard to the present invention.

DISCLOSURE OF INVENTION

Technical Problem

It is an aim of certain examples of the present disclosure to address, solve and/or mitigate, at least partly, at least one of the problems and/or disadvantages associated with the related art, for example at least one of the problems and/or disadvantages described above. It is an aim of certain examples of the present disclosure to provide at least one advantage over the related art, for example at least one of the advantages described below.

Solution to Problem

The present invention is defined in the independent claims. Advantageous features are defined in the dependent claims.

According to the present invention there is provided a method to perform positioning of a User Equipment (UE) in a telecommunication network. The method involves a corresponding positioning configuration procedure for a UE which operates on multiple frequency bands, either simultaneously or sequentially.

The multiple operating frequency bands are multiple bandwidth parts (BWPs) and/or multiple carrier components (CCs) and/or Dual Connection (DC).

Other aspects, advantages, and salient features of the invention will become apparent to those skilled in the art from the following detailed description, which, taken in conjunction with the annexed drawings, disclose examples of the present disclosure.

Advantageous Effects of Invention

The present invention provides improved positioning services in a telecommunication network.

BRIEF DESCRIPTION OF DRAWINGS

The above and other aspects, and features and advantages of certain embodiments and aspects of the present invention will be more apparent from the following detailed description when taken in conjunction with the accompanying drawings, in which.

MODE FOR THE INVENTION

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present invention are to be understood to be applicable to any other aspect, embodiment, example or claim described herein unless incompatible therewith.

Certain examples of the present disclosure provide methods, apparatus and systems for providing Positioning Reference Signals (PRS) for allowing the position of a User Equipment (UE) to be determined in a wireless communication system. For example, certain examples of the present disclosure provide methods, apparatus and systems for providing PRS in 3GPP 5G-NR. However, the skilled person will appreciate that the present invention is not limited to these examples, and may be applied in any suitable system or standard, for example one or more existing and/or future generation wireless communication systems or standards.

LTE positioning has been discussed in Release-9 and Release-11. In Release-15 LTE, some Radio Access Technology (RAT)-dependent positioning techniques were agreed. NR-positioning mechanism is a study item in current RAN1 Release-16 agenda. Observed Time Difference Of Arrival (OTDOA) has been identified as a method for achieving positioning for both DownLink (DL) and UpLink (UL).

In 3GPP TSG RAN WG1 Meeting Ad-Hoc Meeting 1901, Taipei, Taiwan, 21st? 25 Jan. 2019, RAN1 Chairman's Notes, Section 7.2.10, "Study on NR positioning support", the following agreements have been made:
Agreement:
NR DL PRS design for FR1 and FR2 supports:
Configurable NR DL PRS signal bandwidth
FFS granularity of configuration, relationship with BWPs, whether the configuration is cell and/or UE specific
Agreement:
NR UL SRS is used as a starting point for design and analysis of UL PRS
Further study if and which enhancements are needed
FFS: NR UL PRS relationship with UL BWP and component carrier
FR1 refers to Frequency Range 1 (i.e. 450 MHz ? 600 MHz) and FR2 refers to Frequency Range 2 (i.e. 24.25 GHz ? 52.6 GHz). BWP refers to BandWidth Part. SRS refers to Sounding Reference Signal. FFS refers to For Further Study.

In 3GPP Release-16 a Study Item Description (SID)/Work Item Description (WID) on NR positioning is approved. In particular, in RP-181399; 3GPP TSG RAN Meeting #80, La Jolla, USA, Jun. 11-14, 2018, "New SID: Study on NR positioning support", the objectives of this WID are as follows.

Study and evaluate potential solutions of positioning technologies based on the above identified requirements, evaluation scenarios/methodologies [RAN1]
The solutions should include at least NR-based RAT dependent positioning to operate in both FR1 and FR2 whereas other positioning technologies are not precluded.
Minimum bandwidth target (e.g. 5 MHz) of NR with scalability is supported towards general extension for any applications.
Study of positioning architecture for location services, functional interfaces, protocol, and procedures for supporting NR dependent positioning technologies (if needed; otherwise, need to be confirmed) [RAN2, RAN3]
Rel-15 NR positioning architecture/protocol is a starting point of the discussion while the Release 16 LCS architecture enhancement study in TSG SA side is taken into account.
Common architecture with IoT and hybrid positioning.
The positioning architectures should support stand-alone NR for both voice and data including IoT service.
IoT use cases, including potential LPP evolution, and efficient/low-complexity signaling are considered while striving for a common architecture.
End-to-end latency is considered to developing positioning architecture.

IoT refers to Internet of Things. TSG SA refers to Technical Specification Group Service and System Aspects. LPP refers to LTE Positioning Protocol. LCS refers to Location Services.

It is likely that the PRS specified in LTE (from Release 9 onwards) will be adapted as a means to support OTDOA techniques in 5G-NR.

In view of the above agreements and objectives, certain examples of the present disclosure provide one or more techniques for defining the mapping (in particular the frequency locations) of PRS within a system band/Component Carriers (CCs). The skilled person will appreciate that the techniques disclosed herein are not limited to NR or LTE. For example, the techniques disclosed herein may be used to map positioning signals other than PRS of NR or LTE.

Figure 1A:
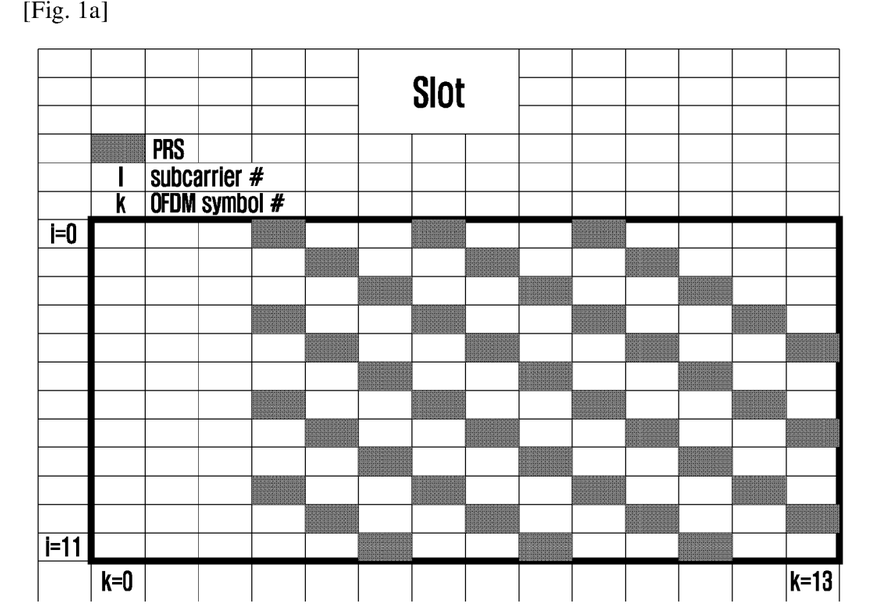
FIGS. 1a-c illustrate exemplary PRS mapping patterns.
Figure 1B:
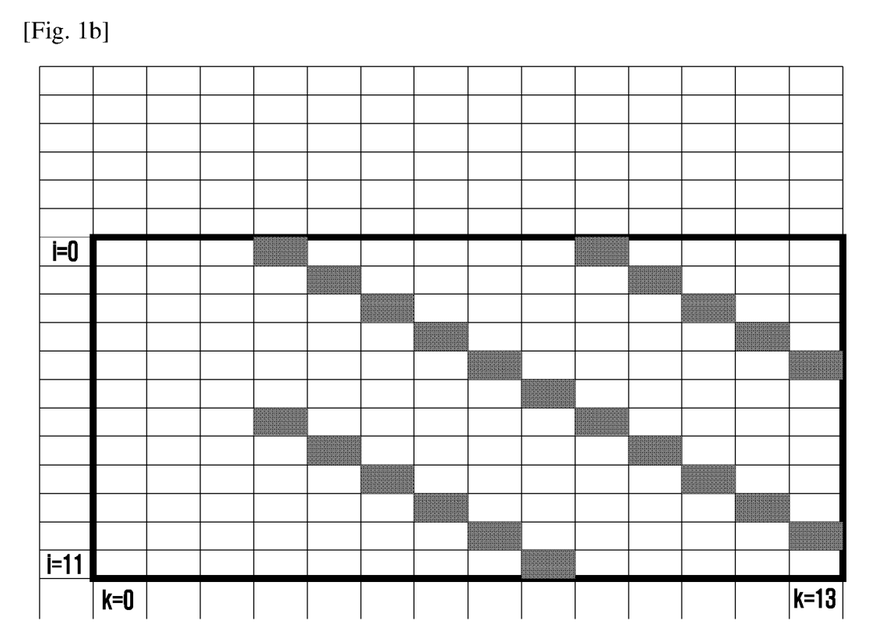
Figure 1C:
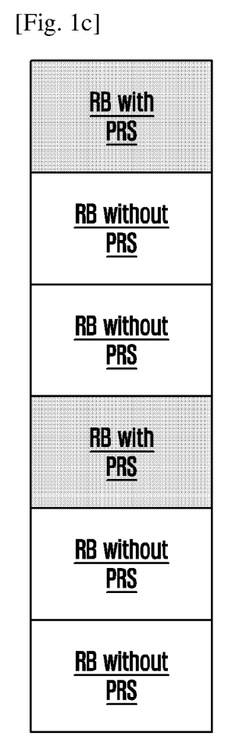

For DL, PRS may be mapped to Resource Elements (REs) of a frame structure according to any suitable mapping scheme. FIGS. 1a-c illustrate exemplary PRS mapping patterns, where FIGS. 1a and 1b illustrate mapping patterns at the subcarrier level while FIG. 1c illustrates a mapping pattern at the Resource Block (RB) level.

The frame structure may be used for certain DL Physical Layer channels, for example a Physical Downlink Shared Channel (PDSCH) and a Physical Downlink Control Channel (PDCCH) for transmitting information (e.g. control signals and data) from a base station (e.g. gNB) to one or more mobile devices (e.g. UEs).

The frame may comprises a number of Orthogonal Frequency Division Multiplexing (OFDM) symbols, each OFDM symbol comprising a number of subcarriers (or Component Carriers (CCs)). Each subcarrier of each symbol may be referred to as a Resource Element (RE). The symbols may be thought of as forming a grid of REs with time along one axis of the grid (the horizontal axis in FIGS. 1a and 1b) and frequency along the other axis of the grid (the vertical axis in FIGS. 1a and 1b). A block of REs comprising a number (e.g. 12) of adjacent subcarriers may be defined as a Physical Resource Block (PRB).

One type of mapping scheme is comb-k pattern, in which PRS are mapped to every kth subcarrier of each symbol, and in which the subcarrier indices to which PRS are mapped cyclically decrements (or increments) with increasing symbol index. FIGS. 1a and 1b illustrate comb-3 and comb-6 patterns at the subcarrier level. In some examples, a mapping scheme at the RB level may be used. For example, according to a comb-m pattern at the RB level, every mth RB includes PRS while other RBs do not include PRS. FIG. 1c illustrates a comb-3 pattern at the RB level. The skilled person will appreciate that other mapping schemes may be used.

UL PRS may be transmitted in a frame structure used for certain UL Physical Layer channels, for example a Physical Uplink Shared Channel (PUSCH) and a Physical Uplink Control Channel (PUCCH) for transmitting information (e.g. control signals and data) from a mobile device (e.g. UE) to a base station (e.g. gNB). UL PRS may be transmitted using the same or a similar mapping pattern as for DL PRS. For example, if SRS is used then comb-2 or comb-4 may be used.

In 5G NR, a bandwidth part (BWP) is defined (e.g. in 3GPP TS 38.211 version 15.2.0 Release 15, Section 4.4.5) as a subset of contiguous common PRBs. A UE can be configured with up to four bandwidth parts in the downlink with a single downlink bandwidth part being active at a given time, and up to four bandwidth parts in the uplink with a single uplink bandwidth part being active at a given time.

In 5G NR, the UE is not expected to receive PDSCH, PDCCH, or CSI-RS (except for RRM) outside an active BWP. The UE shall not transmit PUSCH or PUCCH outside an active BWP. For an active cell, the UE shall not transmit SRS outside an active BWP.

The BWP concept allows a UE to operate bandwidth adaption, wherein the UE may selectively operate using either a narrow bandwidth (reducing power consumption) or a wide bandwidth (when a higher data rate is required (e.g. bursty traffic situation)). Also, the BWP concept addresses a situation in which a UE may not be capable of utilising the entire bandwidth available in 5G.

In view of the above requirements, PRS should be mapped to a BWP. Furthermore, BWPs (BWP1 and BWP2) of two different UEs (UE1 and UE2) may completely overlap, partially overlap, or may not overlap. In the following, techniques are disclosed for determining the mapping of PRS within the overall system band, taking into account BWP utilisation. The skilled person will appreciate that the following techniques may be applied to both DL and UL PRS.

First Example

Figure 2A:
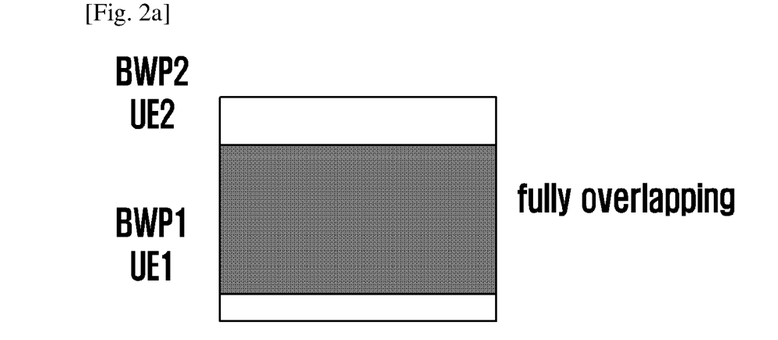
FIGS. 2a-c illustrate exemplary cases of overlapping, non-overlapping and partially overlapping BandWidth Parts (BWP)
Figure 2B:
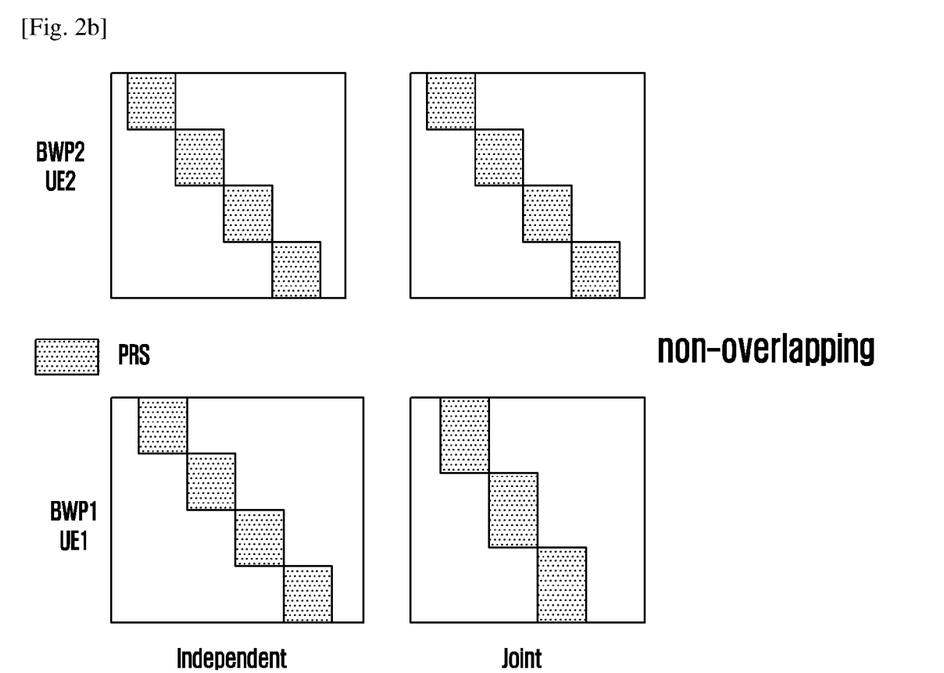
Figure 2C:
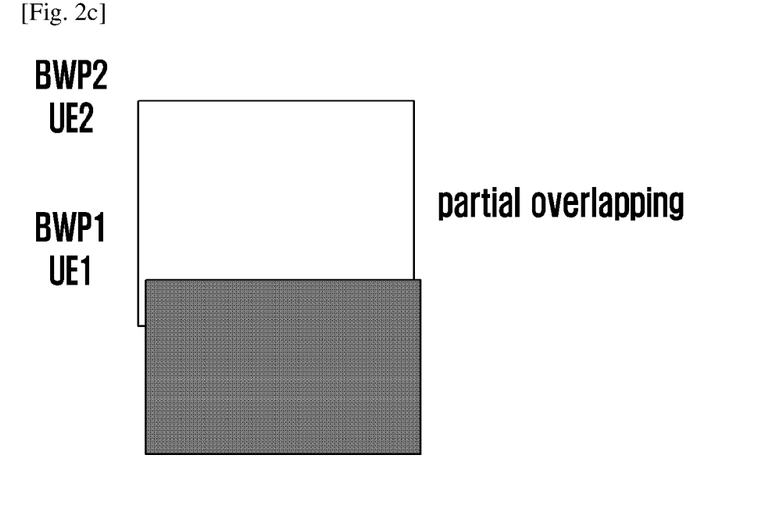

In this example, DL PRS is always within the active or a pre-defined specific (e.g., lowest/highest index) BWP only and bandwidth of PRS can be the same or less than the bandwidth of the active BWP. This configuration can be UE specific configuration. The following three cases, illustrated respectively in FIGS. 2a-c, are considered.

Case 1: Fully Overlapping BWPs (FIG. 2a)

In this case, the BWPs of UE1 and UE2 fully overlap. The supported PRS bandwidth can either be up to minimum bandwidth of all BWPs (e.g. the smallest bandwidth from BWP1 and BWP2=min{Bandwidth (BWP1), Bandwidth (BWP2)}, which is UE1 BWP1 in the example of FIG. 2a), or maximum bandwidth of all BWPs (e.g. the largest bandwidth from BWP1 and BWP2=max{Bandwidth (BWP1), Bandwidth (BWP2)}, which is UE2 BWP2 in the example of FIG. 2a). Accordingly, in the former case PRS may be mapped to REs within BWP1, while in the latter case PRS may be mapped to REs within BWP2. In certain situations, some UEs might not be able to support the maximum BWP. In this case, the supported PRS bandwidth may be up to maximum supported width of all BWPs. The pattern/density of PRS can be aligned with either the highest or the lowest density. For example, in BWP1 the PRS density is higher (e.g. comb-3) and in BWP2 the PRS density is lower (e.g. comb-6). The same comb pattern can be used for both BPWs. If PRS density is aligned with higher density, comb-3 may be used. If PRS density is aligned with lower density, comb-6 may be used. In some examples, UE may need to report if it is capable of operating outside BWP for positioning in a UE capability report.

Case 2: Non Overlapping BWPs (FIG. 2b)

In this case, the BWPs of UE 1 and UE2 do not overlap.

For the non-overlapping case, PRS density/pattern can be configured independently, or jointly with common density/pattern and a reference point in frequency domain (e.g. a starting point in frequency so that the relative position of each BWP can be inferred, for example point A defined in 38.211). For example, different patterns/densities may be used for BWP1 and BWP2 in the independent case, while the same pattern/density may be used for BWP1 and BWP2 in the joint case. For example, for the independent configuration, a first PRS density/pattern may be configured for UE1 such that PRS is mapped to BWP1 according to the first PRS density/pattern, while a second PRS density/pattern may be independently configured for UE2 such that PRS is mapped to BWP2 according to the second PRS density/pattern. For the joint configuration, a common PRS density/pattern is configured for both UE1 and UE2 such that PRS is mapped to BWP1 and BWP2 according to the common PRS density/pattern.

Case 3: Partial Overlapping BWPs (FIG. 2c)

In this case, the UE1 and UE2 BWPs partially overlap.

Two PRS in different BWPs may have different density/pattern. In one example, there is a joint configuration considering the overall band, e.g., a uniform PRS density/pattern can be configured to BWP1+BWP2-overlapping part (i.e. the non-overlapping parts of BWP1 and BWP2). In another example, there is a separate configuration. However, if there are different PRS density/pattern in the overlapping part (i.e. the PRS density/pattern for BWP1 is different from the PRS density/pattern for BWP2), two PRS may collide (i.e. PRS for UE1 and PRS for UE2 may use the same time/frequency resources and hence interfere). One or more of the following examples may be used to resolve potential collisions.

1. Align the density/pattern with lower/higher pattern/density (i.e. same as in the full overlapping case 1 described above);
2. Introduce an offset when collision happens (e.g. an offset is added to the mapped RE index of a colliding PRS so that the PRS is shifted to a different RE thus avoiding collision);
3. Puncture one of the PRS patterns (i.e. puncturing may be applied at REs at which collision occurs);
4. Allow collision but introduce further interference mitigate schemes.

Second Example

In this example, PRS can be mapped to pre-defined positions, e.g., within the central region of the system bandwidth, or a region close (or closest) to the central region of the system bandwidth. The PRS bandwidth may be configured according to one or more of the following examples.

1. PRS can be configured up to system bandwidth of one CC. In this case, UE should be allowed to operate with full system bandwidth.
2. PRS can be configured within one or more BWPs. The same methods discussed above can be used but may have additional constraint that the BWP(s) is/are the BWP(s) containing the subcarrier(s) at the pre-defined position.
3. The above two examples (1 and 2) can be switched based on UE capability report, e.g., whether or not the UE can operate with full system bandwidth.

Third Example

In this example, PRS may be mapped around Synchronization Signal Block (SSB), e.g. with SSB in the centre or in the BWP containing SSB. In the former case, PRS is not necessarily mapped in the BWP. In the latter case, PRS can also be mapped around SSB with SSB in the centre. In case of multiple SSBs are configured, PRS may be mapped to the main SSB with Remaining Minimum System Information (RMSI)/Control Resource Set (CORESET) information or the SSB closest to the central of the full system bandwidth. The bandwidth of PRS may be configured using one or more of the examples 1-4 in the "First Example" described above. In certain examples, PRS should avoid collision with SSB, e.g., puncturing PRS or SSB or adding an offset.

UE Capability Report

In one or more or all of the above examples, UE might need to operate outside its configured BWP. For example, the PRS bandwidth may be larger than the BWP bandwidth configured to the UE. In this case, UE may indicate if such operation is feasible in its capability report and such report can be per BWP or per SCS. The maximum bandwidth on which a UE can operate can be included in this capability report.

The skilled person will appreciate that the above techniques are not limited to application to BWP. For example, the techniques described herein may be applied to Carrier Components (CCs).

The skilled person will appreciate that the examples disclosed herein may be combined and the BWP mentioned is not necessarily the active BWP. In general, the "First Example" described above may be a UE specific configuration, and the "Second Example" and the "Third Example" described above may be either a UE specific or cell specific configuration. The combination of all Examples may be enabled. In certain examples, by default, cell specific configuration is used as a baseline, but UE specific can be enabled when necessary. For example, by default, PRS position density/pattern may be predefined or mapped to SSB on a per cell basis, but UE specific configuration may be enabled when necessary.

A UE operating on multiple frequency bands can be categorised into one of two possible cases in NR:
1. Same Component Carriers (CC) but multiple Bandwidth Parts (BWPs)
2. Multiple CCs.

In the case of multiple BWPs (option 1 above), It has been agreed that multiple BWPs can be configured to a single UE but only one BWP can be active at one time. For OTDOA, positioning reference signals need to be configured and the following embodiments can be considered.

Figure 3:
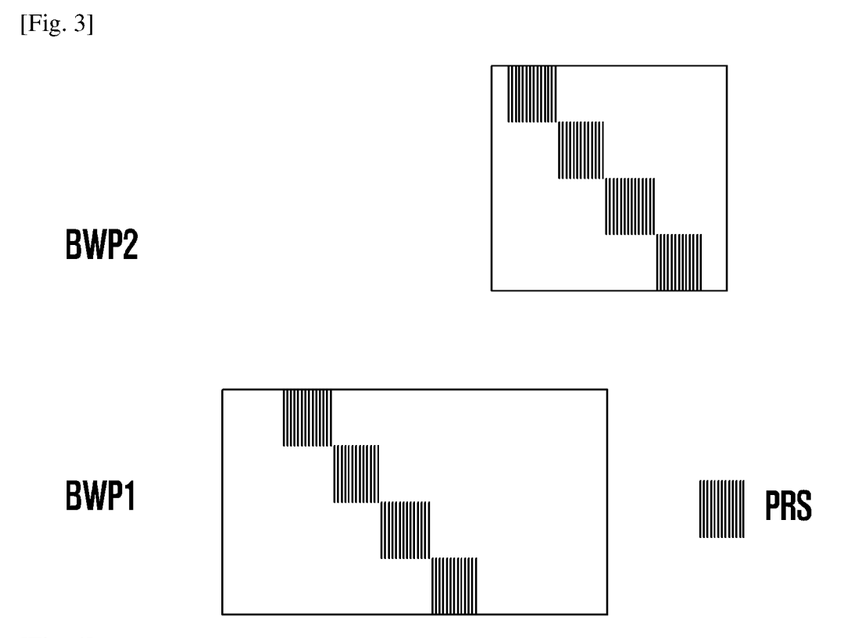
FIG. 3 shows positioning reference signals configured to the active BWP according to an embodiment of the present invention.

In a first embodiment, positioning reference signals are configured to the active BWP. In such a case, positioning reference signals are always configured in the active BWP and it another BWP is activated, a new PRS configuration is applied as shown in FIG. 3, where the shaded BWP is the active BWP, The x and y axes are tine and frequency, respectively. In this sense, the PRS configuration is per BWP. This embodiment can be easily applied to UE-specific PRS configuration.

Figure 4:
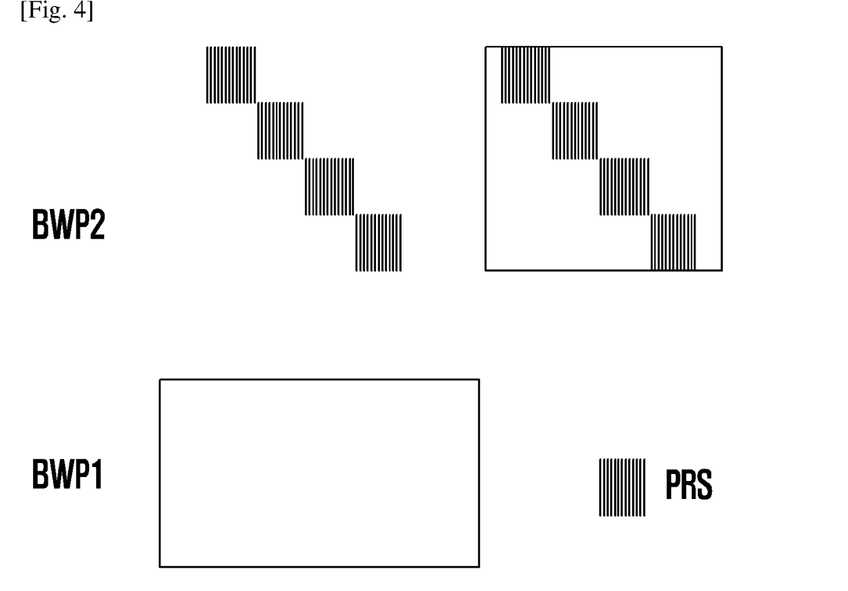
FIG. 4 shows positioning reference signals configured to the fixed BWP according to an embodiment of the present invention.

In a second embodiment, positioning reference signals are configured to a fixed BWP. In such a case, positioning reference signals are always configured in a fixed BWP even when it is not the active BWP. If a UE tries to measure PRS, it has to measure the PRS in the fixed BWP as shown in FIG. 4. PRS is configured to BWP2, and even when BWP1 is activated, only PRS on BWP2 can be measured for positioning. The BWP can be chosen arbitrarily but a natural choice is to configure the PRS in the same BWP as the synchronization signal.

Figure 5:
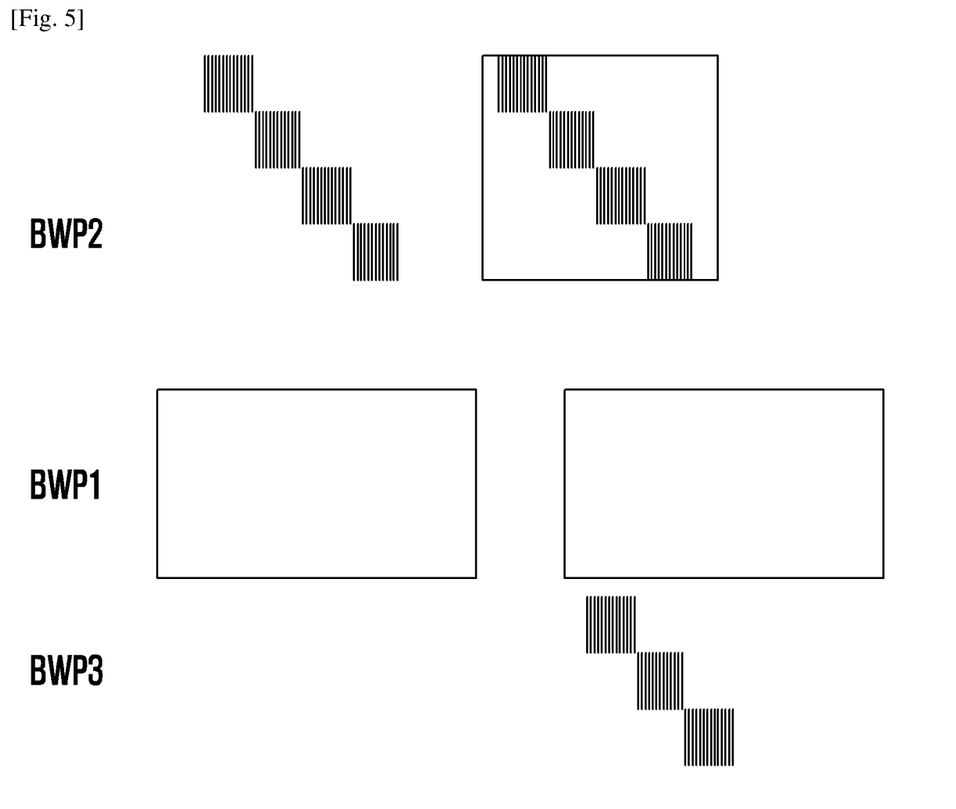
FIG. 5 shows positioning reference signals configured to a configurable BWP according to an embodiment of the present invention.

In a third embodiment, positioning reference signals are configured to a flexible BWP. In such a case, positioning reference signals are still configured to one BWP but which BWP can be configured semi-persistently or dynamically, as required. As shown in FIG. 5, PRS is configured at BWP 2 at first when the active BWP is BWP1. Then UE switches to BWP2 and the PRS configuration is unchanged. Then UE switches back to BWP1 as active BWP but PRS is configured to BWP3. The BWP with PRS is not necessarily the active BWP. It can be chosen based on a variety of criteria:
 Available bandwidth (BW): BWP with wider available BW can be chosen for high positioning accuracy;
 Numerology: larger subcarrier spacing (SCS) means shorter symbol duration and higher positioning accuracy and a BWP with larger SCS can be configured for positioning.

The configuration can be either explicit via LPP, RRC, MAC CE or DCI or implicitly derived from other cell-specific or UE specific configuration parameters.

Another issue is the sequence for DL positioning reference signals. The following three options can be considered:
 Generic pseudo-random sequences are defined by a length-31 Gold sequence;
 M sequence
 ZC sequence Each sequence has its own characteristics and might be suitable for different scenarios, e.g., available bandwidth, different sequence length, etc. It is possible to apply different sequence to different BWPs based on the characteristics of each individual BWP. Such configuration should be included in upper layer configuration for BWP, e.g., RRC, as well as positioning, e.g., LPP.

As mentioned, positioning accuracy depends on available bandwidth and, in order to have similar positioning accuracy for multiple BWPs configured to a single UE, the density/pattern of positioning reference signals can scale with available/allocated bandwidth of each BWP. Assuming p and Nprs represent pattern and bandwidth for positioning reference signals, it should be configured individually to each BWP, e.g., $p_i$ and $N_{prs,i}$ for BWP i.

In the case of E-CID, Round Trip Time (RTT) and Angle of Arrival (AoA) need to be measured. RTT can be obtained from analyzing timing advance measurement of UL reference signals such as SRS, DMRS and PRACH. A timing advance mechanism has already been defined in NR and is similar to the prior art LTE system with the main difference that the time advance step scales with numerology. With larger subcarrier spacing and shorter symbol duration, the timing advance step gets smaller and it will generally lead to improved positioning accuracy.

As NR supports different numerology in different BWP, and multiple BWPs can be configured to one UE, it might leads to different positioning accuracy level depending on the numerology of the active BWP and the impact of this may need investigation. Similar to OTDOA, the following solutions can be considered for positioning:
 only the reference signals in the active BWP are used for RTT measurement;
 the reference signals in a pre-defined or configured BWP are used for RTT measurement no matter which BWP is active at the time of measurement.

For example, the BWP with larger SCS can be configured in second option above. In this case, the configuration can either be explicit via LPP, RRC, MAC CE or DCI or implicitly derived from other cell-specific or UE specific configuration parameters.

AoA measurement is performed at the network side based on UE transmission in UL with the knowledge of gNB antenna configuration. The accuracy of AoA measurement depends on environment as well as factors such as number of antenna elements, antenna spacing and carrier frequency. In a rich scattering environment, the AoA measurement accuracy could be low but in a sparse channel environment, the accuracy might be quite high. The measurement of AoA can also be based on UL reference signals, e.g., SRS, DMRS and PRACH. It is possible that for different frequency bands, different number of antenna elements are activated, e.g., N1 for BWP1 and N2 for BWP2. In such a case, the AoA measurement accuracy is different for BWP1 and BWP2. The following solutions can be considered.
 only the reference signals in the active BWP are used for AoA measurement;
 the reference signals in a pre-defined or configured BWP are used for AoA measurement no matter which BWP is active at the time of measurement.

For example, the BWP with larger number of active antenna elements can be configured in the second case mentioned above. In this case, the configuration can either be explicit via LPP, RRC, MAC CE or DCI or implicitly derived from other cell-specific or UE specific configuration parameters.

For both measurements, the UE should report its measurement capabilities and/or accuracy on a per-BWP basis. It is also beneficial to choose the same reference signal and perform joint measurement for both timing advance and AoA measurement to reduce complexity and latency.

In UTDOA, arrival time difference needs to be measured at multiple gNBs or Location Measurement Units (LMUs) if it is defined in NR. Arrival time difference can be obtained from analyzing timing advance measurement of UL reference signals such as SRS, DMRS and PRACH. Similar to OTDOA, the time difference accuracy depends on available BW, subcarrier spacing and carrier frequency. For both measurements, the UE should report its measurement capabilities and/or accuracy on a per-BWP basis. It is also beneficial to choose the same reference signal and perform joint measurement for both timing advance and AoA measurement to reduce complexity and latency. The following solutions can be considered for positioning.

only the reference signals in the active BWP are used for arrival time difference measurement;
  the reference signals in a pre-defined or configured BWP are used for arrival time difference measurement no matter which BWP is active at the time of measurement.

For example, the BWP with larger available BW can be configured in the second case above. In this case, the configuration can either be explicit via LPP, RRC, MAC CE or DCI or implicitly derived from other cell-specific or UE specific configuration parameters.

In NR, a UE can operate on multiple CCs and the same solutions for BWP can also be applied to multiple CC case. Moreover, LTE-NR dual connection (DC) has been supported in Release-15 and NR-NR DC will be studied in Release-16. These multiple connections from LTE eNB or NR gNB might have different operating bands, different numerology or different antenna elements and thus provide different positioning capability and accuracy. Essentially, the same solutions mentioned previously can also applied to DC as well. It is also possible that among a set of links connecting to eNBs or gNBs, only a sub-set of links are activated or prioritized for positioning because of better positioning capability or accuracy. It is up to gNB to decide which subset to be activated or prioritized and such configuration information can be conveyed to the UE.

Certain examples of the present disclosure may be provided in the form of a base station and/or method therefor. Certain examples of the present disclosure may be provided in the form of a mobile device and/or method therefor. Certain examples of the present disclosure may be provided in the form of a system comprising one or more base stations and one or more mobile devices, and/or method therefor.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the invention has been shown and described with reference to certain examples, it will be understood by those skilled in the art that various changes in form and detail may be made therein without departing from the scope of the invention, as defined by the appended claims.

The invention claimed is:

1. A method performed by a terminal in a wireless communication system, the method comprising:
  identifying information on resources for a positioning reference signal (PRS); and
  performing a measurement for the PRS based on at least one resource among the resources for the PRS,
  wherein a position of the terminal is identified based on a time difference of arrival associated with the measurement for the PRS, and
  wherein the at least one resource is outside an active bandwidth part (BWP) among at least one BWP configured to the terminal, even though the active BWP is an operating bandwidth for the terminal within an operating bandwidth for a cell.

2. The method of claim 1, wherein performing the measurement for the PRS further comprises:
  performing the measurement for the resources for the PRS based on information on a numerology which is different from a numerology of the active BWP.

3. The method of claim 1, wherein a sequence for the PRS is identified based on a pseudo-random sequence, and
  wherein the pseudo-random sequence is identified based on a length-31 Gold sequence.

4. The method of claim 1, wherein the information on the resources includes information on resource element spacing in each symbol of the resources for the PRS.

5. The method of claim 1, wherein the information on the resources includes information on absolute frequency point of the resources for the PRS, and
  wherein the PRS is not mapped to a resource in which synchronization signal block (SSB) is transmitted.

6. A method performed by a base station in a wireless communication system, the method comprising:
  identifying information on resources for a positioning reference signal (PRS); and
  transmitting, to a terminal, the information on the resources for the PRS,
  wherein a measurement for the PRS is performed based on at least one resource among the resources for the PRS, wherein the at least one resource is outside an active bandwidth part (BWP) among at least one BWP configured to the terminal, even though the active BWP is an operating bandwidth for the terminal within an operating bandwidth for a cell, and wherein a position of the terminal is identified based on a time difference of arrival associated with the measurement for the PRS.

7. The method of claim 6, wherein the measurement for the PRS is obtained based on information on a numerology which is different from a numerology of the active BWP.

8. The method of claim 6, wherein a sequence for the PRS is identified based on a pseudo-random sequence, and wherein the pseudo-random sequence is identified based on a length-31 Gold sequence.

9. The method of claim 6, wherein the information on the resources includes information on resource element spacing in each symbol of the resources for the PRS.

10. The method of claim 6, wherein the information on the resources includes information on absolute frequency point of the resources for the PRS, and wherein the PRS is not mapped to a resource in which synchronization signal block (SSB) is transmitted.

11. A terminal in a wireless communication system, the terminal comprising:

a transceiver; and a controller coupled with the transceiver and configured to:

identify information on resources for a positioning reference signal (PRS), and perform a measurement for the PRS based on at least one resource among the resources for the PRS, wherein a position of the terminal is identified based on a time difference of arrival associated with the measurement for the PRS, and wherein the at least one resource is outside an active bandwidth part (BWP) among at least one BWP configured to the terminal, even though the active BWP is an operating bandwidth for the terminal within an operating bandwidth for a cell.

12. The terminal of claim 11, wherein the controller is further configured to:

perform the measurement for the resources for the PRS based on information on a numerology which is different from a numerology of the active BWP.

13. The terminal of claim 11, wherein a sequence for the PRS is identified based on a pseudo-random sequence, and wherein the pseudo-random sequence is identified based on a length-31 Gold sequence.

14. The terminal of claim 11, wherein the information on the resources includes information on resource element spacing in each symbol of the resources for the PRS.

15. The terminal of claim 11, wherein the information on the resources includes information on absolute frequency point of the resources for the PRS, and wherein the PRS is not mapped to a resource in which synchronization signal block (SSB) is transmitted.

16. A base station in a wireless communication system, the base station comprising:

a transceiver; and a controller coupled with the transceiver and configured to:

identify information on resources for a positioning reference signal (PRS), and transmit, to a terminal, the information on the resources for the PRS, wherein a measurement for the PRS is performed based on at least one resource among the resources for the PRS, wherein the at least one resource is outside an active bandwidth part (BWP) among at least one BWP configured to the terminal, even though the active BWP is an operating bandwidth for the terminal within an operating bandwidth for a cell, and wherein a position of the terminal is identified based on a time difference of arrival associated with the measurement for the PRS.

17. The base station of claim 16, wherein the measurement for the PRS is obtained based on information on a numerology which is different from a numerology of the active BWP.

18. The base station of claim 16, wherein a sequence for the PRS is identified based on a pseudo-random sequence, and wherein the pseudo-random sequence is identified based on length-31 Gold sequence.

19. The base station of claim 16, wherein the information on the resources includes information on resource element spacing in each symbol of the resources for the PRS.

20. The base station of claim 16, wherein the information on the resources includes information on absolute frequency point of the resources for the PRS, and wherein the PRS is not mapped to a resource in which synchronization signal block (SSB) is transmitted.

* * * * *